US009583227B2

(12) United States Patent
Li et al.

(10) Patent No.: US 9,583,227 B2
(45) Date of Patent: Feb. 28, 2017

(54) OPTICAL DEVICE FOR FOCUSING SYNCHROTRON RADIATION LIGHT SOURCE

(71) Applicant: Beijing Normal University, Beijing (CN)

(72) Inventors: Yude Li, Beijing (CN); Xiaoyan Lin, Beijing (CN); Jinlong He, Beijing (CN); Zhiguo Liu, Beijing (CN)

(73) Assignee: BEIJING NORMAL UNIVERSITY, Beijing (CN)

( * ) Notice: Subject to any disclaimer, the term of this patent is extended or adjusted under 35 U.S.C. 154(b) by 55 days.

(21) Appl. No.: 14/434,515

(22) PCT Filed: Jun. 21, 2013

(86) PCT No.: PCT/CN2013/077687
§ 371 (c)(1),
(2) Date: Apr. 9, 2015

(87) PCT Pub. No.: WO2014/056332
PCT Pub. Date: Apr. 17, 2014

(65) Prior Publication Data
US 2015/0279492 A1 Oct. 1, 2015

(30) Foreign Application Priority Data
Oct. 9, 2012 (CN) .................... 2012 2 0513794 U

(51) Int. Cl.
*G21K 1/02* (2006.01)
*C03C 13/00* (2006.01)
*G21K 1/06* (2006.01)

(52) U.S. Cl.
CPC ................ *G21K 1/02* (2013.01); *G21K 1/067* (2013.01)

(58) Field of Classification Search
CPC . G02B 6/02328; G02B 6/02371; G02B 6/021; G02B 6/02314; G02B 6/02333; G02B 6/0096; G02B 6/02042; G02B 6/4415; G02B 6/4432; G02B 6/4486; G02B 27/0994; C03B 37/02781; C03B 37/027; C03B 37/0279; C03B 23/207; H01S 3/06741; H01S 3/094007; H01S 3/094053; A61B 1/00165; C03C 13/04; C03C 13/00; C03C 13/046
(Continued)

(56) References Cited

U.S. PATENT DOCUMENTS 2,638,554 A * 5/1953 Bartow .................. G21K 1/025 315/9
3,997,794 A * 12/1976 York ........................ A61B 6/06 250/363.1
(Continued)

FOREIGN PATENT DOCUMENTS

CN 101661807 A 3/2010
CN 101667468 A 3/2010
(Continued)

OTHER PUBLICATIONS

PCT International Search Report and Written Opinion for PCT/CN2013/077687, Sep. 26, 2013, 9 Pages.

*Primary Examiner* — David A Vanore
(74) *Attorney, Agent, or Firm* — Quarles & Brady LLP

(57) ABSTRACT

An optical device for focusing synchrotron radiation light source is disclosed according to the present invention, so as to improve the uniformity of the light intensity of the emergent light, to increase the divergence the emergent light, and to restrain the synchrotron radiation higher harmonics. An outline generatrix of the optical device is a quadratic curve segment or a combination of a plurality of quadratic curve segments, the opening orientations of which
(Continued)

are the same, and the optical device includes: a plurality of capillary bodies made of transparent material, wherein the capillary bodies in a center region have a solid construe; the capillary bodies in a periphery region located outside of the center region have a hollow structure.

12 Claims, 4 Drawing Sheets

(58) Field of Classification Search
USPC ................ 385/125, 126, 115, 100, 109, 127, 113,385/122, 128, 136, 137, 14, 142; 378/150, 65, 378/85
See application file for complete search history.

(56) References Cited

U.S. PATENT DOCUMENTS

| | | | | |
|---|---|---|---|---|
| 5,627,870 | A * | 5/1997 | Kopecky | A61N 5/1084 378/65 |
| 5,745,547 | A * | 4/1998 | Xiao | G21K 1/06 250/505.1 |
| 6,624,431 | B1 * | 9/2003 | Foster | B82Y 10/00 250/363.1 |
| 6,749,300 | B2 * | 6/2004 | Bjeoumikhov | C03B 23/047 351/159.01 |
| 7,471,866 | B2 * | 12/2008 | Dumais | B82Y 10/00 385/129 |
| 8,372,470 | B2 * | 2/2013 | Hart | B01J 23/745 423/445 B |
| 2002/0148808 | A1 | 10/2002 | Bjeoumikhov | |
| 2003/0209677 | A1 * | 11/2003 | Kumakhov | B82Y 10/00 250/505.1 |
| 2009/0279670 | A1 * | 11/2009 | Verman | B82Y 10/00 378/145 |
| 2010/0061511 | A1 * | 3/2010 | Heid | G21K 1/046 378/65 |
| 2010/0296629 | A1 * | 11/2010 | Dabagov | G21K 1/06 378/85 |

FOREIGN PATENT DOCUMENTS

| | | |
|---|---|---|
| CN | 102890975 A | 1/2013 |
| CN | 202905197 U | 4/2013 |

* cited by examiner

OPTICAL DEVICE FOR FOCUSING SYNCHROTRON RADIATION LIGHT SOURCE

CROSS-REFERENCE TO RELATED APPLICATIONS

This application claims priority to Chinese Patent Application No. 201220513794.8, filed on Oct. 9, 2012, and entitled "OPTICAL DEVICE FOR FOCUSING SYNCHROTRON RADIATION LIGHT SOURCE", the disclosure of which is incorporated herein by reference in its entirety.

TECHNICAL FIELD

The present invention refers to a field of material and optics technology, particularly to an optical device for focusing synchrotron radiation.

BACKGROUND

The synchrotron radiation light source becomes an important tool for revealing material structure and Biological Phenomena as its specific characters such as high brightness, collimation and energy continuity, and is applied to subject fields, such as material field, geology field, biological field, environment field and archaeology field and the like. With the development of the synchrotron radiation technology, X-RAY microbeam analysis technology with X-RAY focusing optical device has become a mainstream analysis technology for a synchrotron radiation application.

The synchrotron radiation devices are distinguished from each other according to constructions, performances and usages thereof, and have developed to the third generation. The first and second generation of the synchrotron radiation are characterized in that the size of the light source point is relative large and the divergence thereof is relative high. So far, a toroidal mirror is generally adapted in the first or second international generation of the synchrotron radiation device, by which a beam with a diameter of tens millimeters in a horizontal direction and a beam with a diameter of a few millimeters in a vertical direction are one-time focused, and the focused beam therein, either in the horizontal direction or the vertical direction are a few submillimeters. The light intensity of each one-time focused beam is distributed in a manner of Gaussian distribution with high light intensity in the center and low light intensity at the edge. However, when conducting a research and analysis to an X-Ray diffraction and fluorescence, the light intensity distribution of the incident light is as uniform as possible.

High pressure absorption spectrum is an important future development direction of the X-Ray absorption spectrum, which is used to research changes of a local structure and an electron structure of a sample, and to dynamically and in situ reveal a few of dynamic properties of the sample by applying a pressure to the sample through diamond Anvil Cell. Due to a crystal structure of diamond, when performing high pressure absorption spectrum measurement, the normal measurement of the absorption spectrum is significantly influenced by diffraction signals generated by the diamond.

Additionally, a monochromatic light emerged by a monochromator from a synchrotron radiation of a continuous spectrum includes higher harmonics which seriously impacts a light source, a prober and calibration accuracy of the optical device, and a deviation of experiment data is increased due to the interference of the harmonics, even leading to an inaccurate experimental conclusion. Therefore, restraining higher harmonics in the light source to improve the quality of the light source is important to improve the accuracy of the experiment conclusion.

SUMMARY OF THE INVENTION

An optical device for focusing X-Ray is provided according to embodiment of the present disclosure, so as to improve light intensity uniformity of an emergent light, thereby increasing divergence of emergent beam or restraining synchrotron radiation higher harmonics.

An optical device for focusing a synchrotron radiation light source, an outline generatrix of the optical device is a quadratic curve segment or a combination of a plurality of quadratic curve segments, the opening orientations of which are the same, and the optical device includes: a plurality of capillary bodies made of transparent material, wherein the capillary bodies in a center region have a solid construe; the capillary bodies in a periphery region located outside of the center region have a hollow structure. In the present embodiment, solid capillary bodies are arranged in the center region and the hollow capillary bodies are arranged in the periphery region, i.e. an optical device for one-time focusing a synchrotron radiation light source, so as to change the light intensity of the light being one-time focused by a synchrotron radiation device from the Gaussian distribution of the light intensity distribution into approximate uniform distribution, while the divergence the emergent light is increased, thereby weakening the influence of diffraction signals caused by a crystal, such as diamond to the measurement of high pressure absorption spectrum. Additionally, the optical device is configured to restrain synchrotron radiation higher harmonics.

Preferably, an external diameter of a capillary body in the center region is larger than that of a capillary body in the periphery region; or the external diameters of all the capillary bodies are the same. If the external diameter of a capillary body in the center region is larger than that of a capillary body in the periphery region, the amount of the capillary bodies is reduced without changing the volume of the optical device and the manufacture process is simplified. If the external diameters of all the capillary bodies are the same, the manufacture process of a single capillary body is simplified.

Preferably, a wall thickness of one capillary body closer to the edge of the optical device is smaller, so as to improve uniformity for focusing X-Ray.

Preferably, the transparent material is glass material. The smoothness of the capillary body made of the glass material is relative better.

Preferably, the glass material includes one or more elements of Li, Be and B. The smoothness of the capillary body made of the glass material with such elements is relative better.

Preferably, the capillary body in the periphery region is consisted of a film made of non-transparent material.

Preferably, the non-transparent material is metal. The reflecting film consisted of metal material possesses a better reflection effect.

Preferably, the metal includes one or more elements of Wolfram, Gold and Platinum, the reflection effect of which is better.

Preferably, the film made of non-transparent material is located on the outer surface of the capillary body, so as to obtain a better reflection effect and reduce the difficulty for coating film.

Other features and advantages of the present disclosure will be described below, a part of which will become transparent according to the description or will be understood in implementing the present disclosure. The object and other advantages of the present disclosure may be implemented and obtained according to the description, appended claims and specific structures indicated in drawings.

The technical solution of the present disclosure is further described in detail through the appended drawings and embodiments.

DESCRIPTION OF DRAWINGS

Drawings are provided to further understand the present disclosure, construct a part of the description, and are used to explain the present disclosure with embodiments of the present disclosure, and are not used to limit the present invention. In drawings.

DETAILED DESCRIPTION OF THE PREFERRED EMBODIMENT

The present disclosure will be described below further in detail with reference to the accompanying drawings. It is appreciated that the specific embodiments described herein are merely used to describe and explain the present disclosure, rather than limiting the present disclosure.

The inventor of the present invention finds that, with the current optical device consisted of glass capillary tube in the related art, the light intensity of emergent light of focused X-Ray is distributed in a manner of Gaussian distribution. That is, the light intensity in the center is obviously higher than the light intensity at the edge. However, in a practical application and research, it is hope to obtain an X-Ray with uniform intensity. Therefore, in the present embodiment, solid capillary bodies are arranged in a center region and hollow capillary bodies are arranged in a periphery region, i.e., an optical device for focusing synchrotron radiation light source, so as to obtain relative uniform focused X-Ray. The optical device for focusing synchrotron radiation light source is also configured to focus X-Ray reflected by a toroidal mirror, so as to change the distribution of the light intensity of the one-time focused light by a synchrotron radiation device from the Gaussian Distribution into uniform distribution, thereby implementing a second-time focus, at the same time, the divergence the emergent light is increased, thereby weakening the influence of diffraction signals caused by a crystal, such as diamond to the measurement of high pressure absorption spectrum. Additionally, the optical device is configured to restrain synchrotron radiation higher harmonics.

Figure 1A:
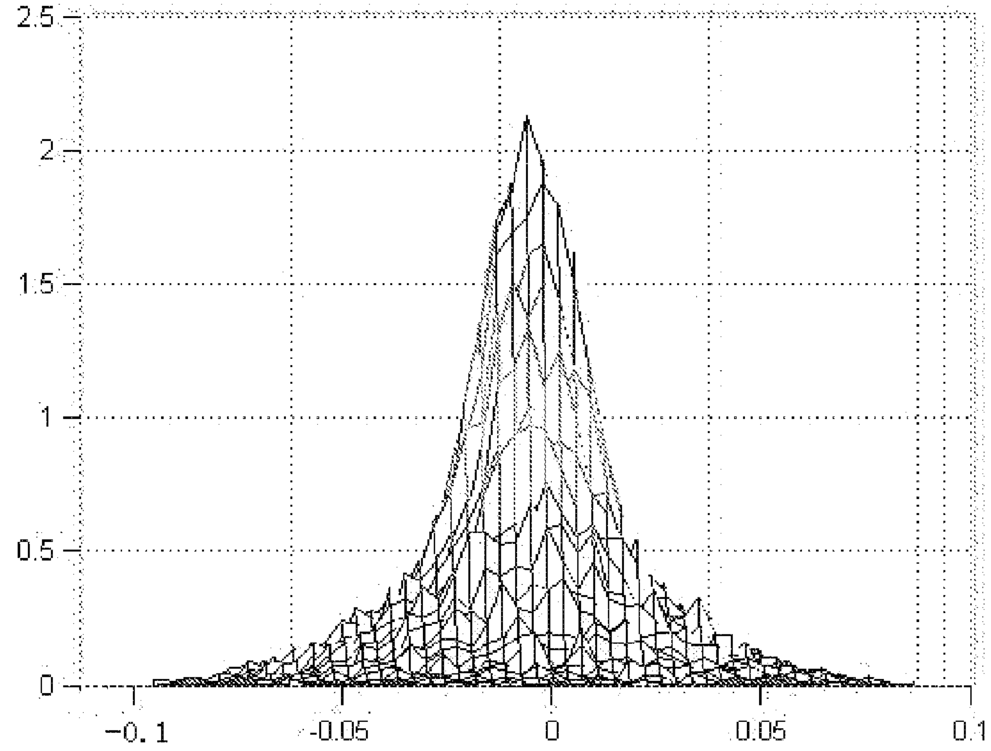
FIG. 1A is a schematic graph of a light intensity distribution of focused X-Ray in the related art.
Figure 1B:
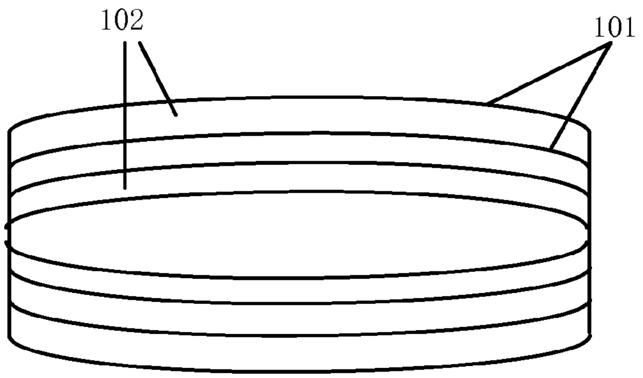
FIG. 1B is a schematic diagram showing a structure of an optical device according to an embodiment of the present disclosure.

As shown in FIG. 1B, the optical device according to the present embodiment is of an axial symmetry structure, in particular, a shape of a horizontal cross-section at any point is nearly a circle. A pair of edges of two pairs of edges of the vertical cross-section are parallel to each other, and another pair of edges are arcs with opposite openings, and the arcs are respectively in conformity with quadratic curve equations. That is, an outline generatrix 101 is a quadratic curve segment or a combination of a plurality of quadratic curve segments, the opening orientations of which are the same. preferably, the outline generatrix 101 is a parabola or an elliptical arc.

Figure 2:
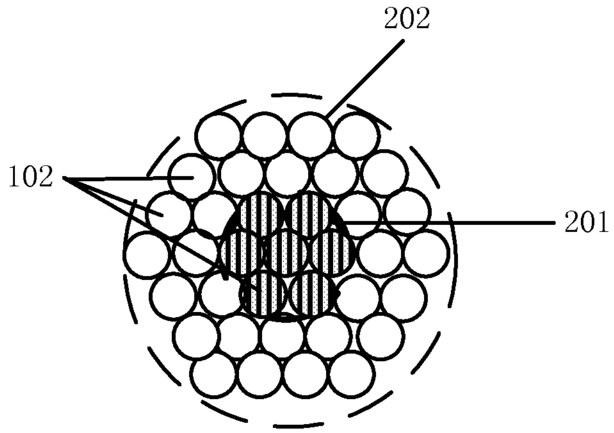
FIG. 2 is a cross-section schematic diagram of an optical device according to an embodiment of the present disclosure.

The optical device includes a single capillary body 102 made of transparent material. As shown in FIG. 2, the capillary body 102 in a center region 201 is of solid structure, the capillary body 102 in a periphery region 202 located outside the center region 201 is of hollow structure, and the capillary body 102 in the periphery region 202 is consisted of a film made of non-transparent material.

Figure 3:
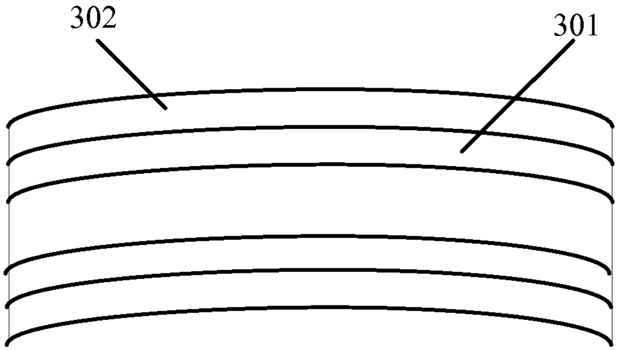
FIG. 3 is a schematic diagram showing a structure of capillary bodies in the periphery region according to an embodiment of the present disclosure.
Figure 4:
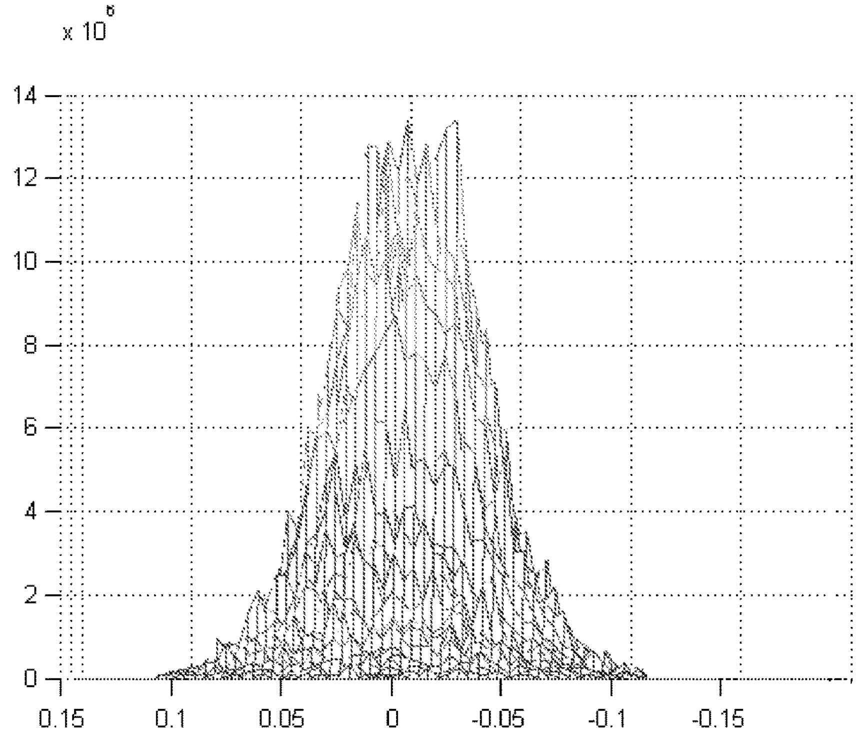
FIGS. 4-7 are schematic diagrams of light intensity distributions of focused X-Ray according to embodiments of the present disclosure.
Figure 5:
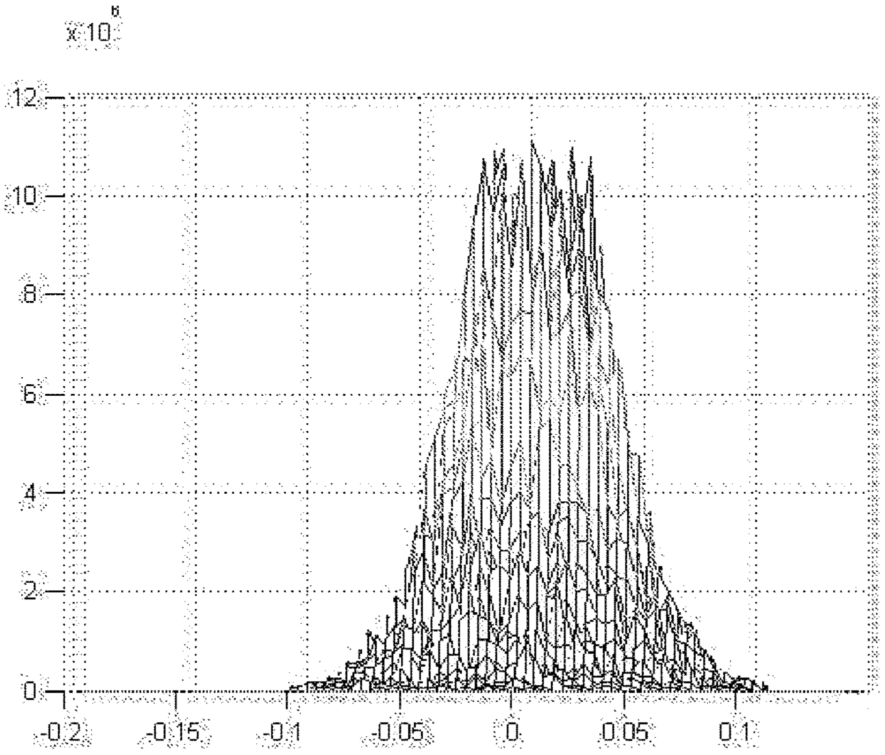
Figure 6:
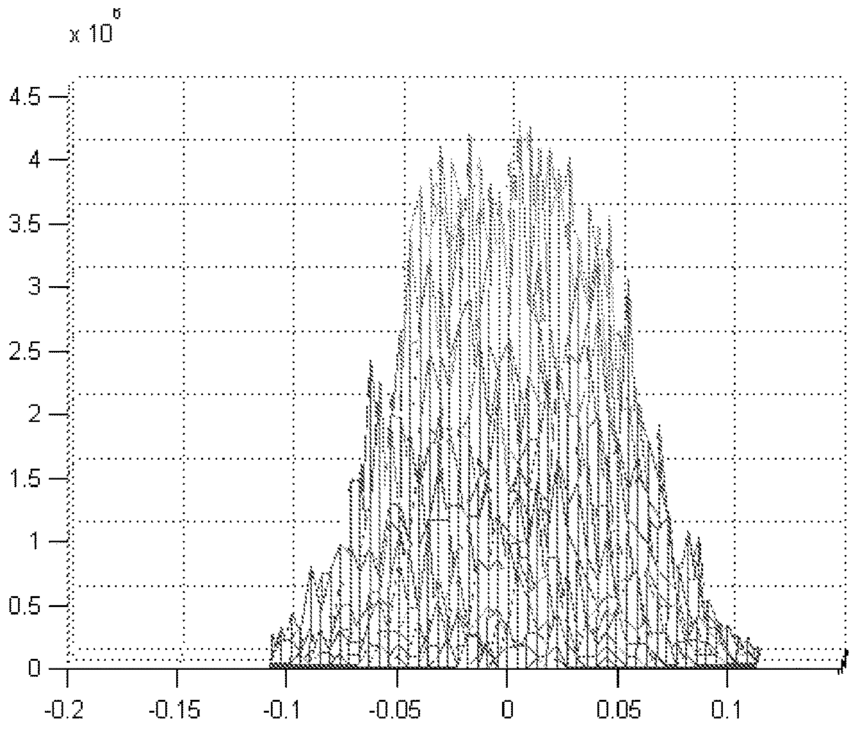
Figure 7:
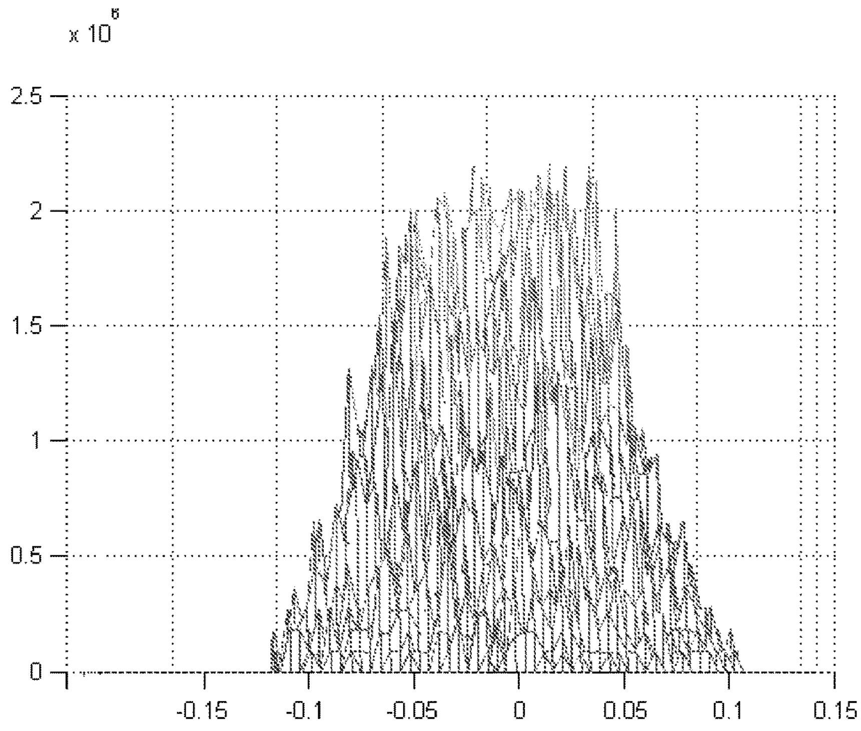

As shown in FIG. 3, the capillary body 102 in the periphery region 202 includes two parts, in which one part is a hollow tube 301 made of transparent material, the other part is a film 302 made of non-transparent material, with which the outer surface of the hollow tube 301 is coated.

Of course, the capillary body 102 in the center region 201 may also be coated with a film 302 made of transparent material.

Preferably, the transparent material is glass material. Specifically, the glass material is a kind of lightweight glass with relative low density, and the glass material includes one or more elements of Li, Be and B. For example, the composition of glass includes:

| C OMPOSITON | Content ( Weihgt ) |
|---|---|
| $SiO_2$ | 75.5% |
| $B_2O_3$ | 15.5% |
| $Al_2O_3$ | 3.4% |
| $Fe_2O_3$ | 0.08% |
| $Na_2O$ | 4.7% |
| $K_2O$ | 0.6% |

Preferably, the non-transparent material is metal. In order to increase the refractivity of glass and that of metal, to increase the total reflection critical Grazing angle, that is, to improve the ability of focusing high power X-Ray, heavy metal with relative high density is adopted in the present embodiment, the heavy metal includes one or more elements of Wolfram, Gold and Platinum, in which Wolfram is preferable in consideration of a manufacture process and cost.

One end of two ends of the optical device is configured to receive X-Ray and the other end is configured to output X-Ray. The critical surface between the glass material and the metal material is a reflection surface, which is configured to totally reflect X-Ray when X-Ray reached the reflection surface in the optical device, and the X-Ray is focused at the other end.

Preferably, an external diameter of a capillary body in the center region is larger than that of a capillary body in the periphery region; or the external diameters of all the capillary bodies are the same. If the external diameter of a capillary body in the center region is larger than that of a capillary body in the periphery region, the amount of the capillary bodies is reduced without changing the volume of the optical device and the manufacture process is simplified. If the external diameters of all the capillary bodies are the same, the manufacture process of a single capillary body is simplified.

Preferably, a wall thickness of one capillary body closer to the edge of the optical device is smaller. Particularly, in a case that external diameters of all the capillary tube 102 in the periphery region 202 are the same, an inner diameter of a capillary tube 102 closer to the edge is larger, which may improve uniformity of the focused X-Ray.

For example, in a case that an external diameter at the inlet of the capillary tube 102 is 6.25 um, the outlet of the capillary tube 102 is 2.5 um, an inner diameter of the capillary tube 102 in the periphery region 202 is 5 um, the outlet is 2 um, a length of a middle axis is 65 mm, the outline generatrix of the optical device is $y=-0.0012x^2+0.0025x+5.2813$, the amount of capillary tube is kk=80, when the amount of the capillary tubes 102 in the center region 201 is 25 to 40, a relative obvious stage is emerged: the width thereof is 40 to 50 um. FIGS. 4 to 7 are respectively schematic graphs of light intensity distributions with respective 10, 20, 30 and 35 capillary tubes 102 in the center region 201. Distances from an outlet of the optical device is indicated on the horizontal axis, while light intensities are indicated on the vertical axis. As shown in those drawings, if the amount of the capillary tubes 102 in the center region 201 is larger, a focal spot is larger, which indicates that the uniformity is better. However, there is a preferable range for the amount of the capillary tubes, if the amount of the capillary tubes exceeds the preferable range, a flaw may occur in a stage of focused light intensity, that is, the light intensity corresponding to the center region 201 is lower than that corresponding to the periphery region 202, thereby reducing the uniformity.

In such case, the divergence of focused X-Ray is represented in table 1:

TABLE 1

| | K | | | |
|---|---|---|---|---|
| | k = 0 | k = 15 | k = 25 | k = 40 |
| Divergence/ mrad | 5.05 | 5.325 | 5.82 | 6.75 |

The divergence of focused X-Ray is represented in Table 1, the divergence of focused X-Ray is larger as the amount of the capillary tubes 102 in the center region 201 is larger. k=0 represents the amount of the capillary tubes 102 in the center region 201 is 0, that is, all of the capillary tubes are hollow tubes, i.e. the optical device in the related art, therefore the optical device according to the present disclosure is better than the optical device in the related art in uniformity and divergence of focused light thereby. Furthermore, as comparing to the completely solid optical device, the optical device according to the present disclosure is better than the optical device in the related art in uniformity and divergence of focused light thereby.

Additionally, the optical device according to the present embodiment may restrain higher harmonics well, and a fundamental wave and a triple frequency are presented in the X-Ray energy region; that is, two kinds of light with energy E and 3E is presented; wherein E represents the fundamental wave and 3E represents higher harmonics. As calculated, an inner diameter at the inlet of capillary tube 102 in the periphery region 202 is 12.6 um, and that at the outlet is 6 um, a middle axis of the optical device is 40 mm, the amount of the optical device is kk=30. In a case that the amount of capillary tubes 102 in the center region 201 is 15, the transmission efficiency is shown in Table 2:

TABLE 2

| | transmission efficiency | |
|---|---|---|
| | E = 5 kev | E = 15 kev |
| k = 0 | 82.2% | 34.0% |
| k = 15 | 70.2% | 12% |

As can be seen in Table 2, the optical device according to the present embodiment may restrain higher harmonics (E=15 kev) well, the transmission efficiency of higher harmonics of a completely solid optical device in the related art is 34%, and the transmission efficiency of higher harmonics of an optical device according to the present disclosure is 12%, while E=5 kev, the transmission efficiency varies.

Those skilled in the art should appreciate that embodiments of the present invention may be provided as a method, system, or computer program product. Accordingly, the present invention may be of an entirely hardware embodiment, an entirely software embodiment, or a combination of forms of embodiment of software and hardware aspects. Furthermore, the present invention may be implemented in the form of one or more of which comprises a computer usable program code computer usable storage media (including, but not limited to, disk storage, CD-ROM, optical memory, etc.) on a computer program product.

The present invention has been described in accordance with an embodiment of the method of the present invention, apparatus (systems), and computer program products of the flowchart and/or block diagrams described. It should be understood by computer program instructions, and a combination of the flowchart illustrations and/or block diagram showing each process and/or blocks in the flowchart and/or block diagram of the process and/or box. These computer program instructions may be provided to a general purpose computer, special purpose computer, embedded processor or other programmable data processing apparatus to produce a machine, such that the instructions executed by a computer or other programmable data processing apparatus generating means to be implemented in one or more flow processes the flowchart and/or block diagram block or blocks in a specified function.

These computer program instructions may also be stored in a computer can direct a computer or other programmable data processing apparatus to function in a particular manner readable memory, such that stored in the computer-readable instructions in the memory to produce an article of manufacture including instruction means The instruction means implemented in a process flow chart or more processes and/or block diagram block or blocks in a specified function.

These computer program instructions may also be loaded onto a computer or other programmable data processing equipment, making the implementation of a series of steps on the computer or other programmable apparatus to produce a computer implemented, resulting in a computer or other programmable apparatus provide instruction on execution of the flowchart for implementing the one or more flow processes and/or block diagram block or blocks in a specified function of the step.

Obviously, those skilled in the art may make various modifications of the present invention and modifications without departing from the spirit and scope of the invention. Thus, if such modifications and variations of the present invention and the claims of the invention belongs to the technical scope of equivalents, the present invention is also intended to include these changes and modifications included.

The invention claimed is:

1. An optical device for focusing a synchrotron radiation light source, wherein the optical device has an axially symmetric structure that is symmetric about an axis of the optical device, a contour of the optical device includes a quadratic curve segment, that includes a parabolic segment, and the optical device comprising:

a plurality of capillary bodies made of transparent material, wherein the capillary bodies in a center region have a solid structure; and wherein the capillary bodies in a periphery region located outside of the center region have a hollow structure.

2. The optical device of claim 1, wherein an external diameter of a capillary body in the center region is larger than that of a capillary body in the periphery region; or the external diameters of all the capillary bodies are the same.

3. The optical device of claim 1, wherein a wall thickness of one capillary body is not uniform, and the part of wall which is farther away from the axis of the optical device has a thinner thickness than that of the part of wall which is closer to the axis of the optical device.

4. The optical device of claim 1, wherein the transparent material is glass material.

5. The optical device of claim 4, wherein the glass material includes one or more elements of Li, Be and B.

6. The optical device of claim 5, the capillary body in the periphery region is consisted of a film made of non-transparent material.

7. The optical device of claim 6, wherein the non-transparent material is metal.

8. The optical device of claim 7, wherein the metal includes one or more elements of Wolfram, Gold and Platinum.

9. The optical device of claim 1, wherein the film made of non-transparent material is located on the outer surface of the capillary body.

10. An optical device for focusing a synchrotron radiation light source, comprising:

a plurality of capillary bodies made of transparent material; and wherein the capillary bodies in a center region have a solid structure, the capillary bodies in a periphery region located outside of the center region have a hollow structure; and wherein the optical device has a symmetrical structure about an axis of the optical device, a contour of the optical device including a plurality of parabolic segments connected serially, and the opening orientations of plurality of parabolic segments are the same.

11. The optical device of claim 10, wherein the transparent material is glass material; and wherein a shape of a vertical cross-section of the symmetrical structure comprises edges with opposite openings.

12. The optical device of claim 10, wherein a wall thickness of one capillary body is not uniform, and the part of wall which is farther away from the axis of the optical device has a thinner thickness than that of the part of wall which is closer to the axis of the optical device.

* * * * *